(12) United States Patent
Gooden et al.

(10) Patent No.: US 9,643,198 B2
(45) Date of Patent: May 9, 2017

(54) SPRAYER WITH SUDSING ATTACHMENT

(71) Applicant: Hopkins Manufacturing Corporation, Emporia, KS (US)

(72) Inventors: Marcus Gooden, LomaLinda, CA (US); Pieter Schouten, Berkeley, CA (US)

(73) Assignee: HOPKINS MANUFACTURING CORPORATION, Emporia, KS (US)

(*) Notice: Subject to any disclaimer, the term of this patent is extended or adjusted under 35 U.S.C. 154(b) by 0 days.

(21) Appl. No.: 14/936,184

(22) Filed: Nov. 9, 2015

(65) Prior Publication Data

US 2016/0059253 A1    Mar. 3, 2016

Related U.S. Application Data

(63) Continuation of application No. 29/499,010, filed on Aug. 11, 2014, now Pat. No. Des. 742,998.

(51) Int. Cl.
| | |
|---|---|
| *B05B 7/26* | (2006.01) |
| *B05B 7/28* | (2006.01) |
| *B05B 7/24* | (2006.01) |
| *B05B 15/06* | (2006.01) |
| *B05B 7/02* | (2006.01) |
| *B05B 9/01* | (2006.01) |
| *B08B 3/02* | (2006.01) |
| *B60S 3/04* | (2006.01) |

(52) U.S. Cl.
CPC .............. *B05B 7/2443* (2013.01); *B05B 7/02* (2013.01); *B05B 9/01* (2013.01); *B05B 15/065* (2013.01); *B08B 3/026* (2013.01); *B60S 3/044* (2013.01)

(58) Field of Classification Search
CPC  B05B 7/2443; B05B 7/02; B05B 9/01; B05B 15/065; B08B 3/026; B60S 3/044
USPC ........ 239/315, 302, 310, 375, 378, 525, 526
See application file for complete search history.

(56) References Cited

U.S. PATENT DOCUMENTS

| | | | | |
|---|---|---|---|---|
| 3,940,069 A | * | 2/1976 | Gunzel, Jr. ............... | B05B 7/12 222/331 |
| 4,527,740 A | * | 7/1985 | Gunzel, Jr. ........... | B05B 1/1654 239/318 |
| 5,595,345 A | * | 1/1997 | Chura ................... | B05B 1/1636 239/312 |
| 6,182,911 B1 | * | 2/2001 | Hanks ................... | B01F 5/0077 239/318 |

(Continued)

*Primary Examiner* — Justin Jonaitis
(74) *Attorney, Agent, or Firm* — George R. McGuire; Bond, Schoeneck & King, PLLC

(57) ABSTRACT

A handheld car washing implement that includes a handle defining a channel for receiving a flow of water, the handle including a nozzle in communication with the channel, wherein the handle further includes a plurality of teeth, extending radially outward from the nozzle; a sprayer, defining a second channel having a first and a second end, wherein the second end terminates in a second nozzle and the first end is dimensioned to receive at least a portion of the nozzle of the handle such that the flow of water is directed into the second channel, wherein the sprayer further includes a plurality of tabs, spaced to engage at least one of the tabs and a canister in communication with the second channel via a port, and configured to store and deliver a detergent to the second channel when water is flowing through the second channel.

5 Claims, 5 Drawing Sheets

(56) References Cited

U.S. PATENT DOCUMENTS

| | | | |
|---|---|---|---|
| 2002/0008161 A1* | 1/2002 | Ketcham | B05B 7/2443 239/310 |
| 2003/0192964 A1* | 10/2003 | Foster | B05B 1/267 239/525 |
| 2006/0091237 A1* | 5/2006 | Dodd | B05B 7/1209 239/310 |
| 2007/0102542 A1* | 5/2007 | MacLean-Blevins | B05B 7/12 239/318 |
| 2008/0185842 A1* | 8/2008 | Blackman | F16L 15/006 285/376 |
| 2009/0173806 A1* | 7/2009 | Gavin | B05B 1/1636 239/310 |

* cited by examiner

SPRAYER WITH SUDSING ATTACHMENT

CROSS-REFERENCE TO RELATED APPLICATIONS

This application claims priority to U.S. Design application Ser. No 29/499,010, filed on Aug. 11, 2014 and entitled Sprayer, the entire disclosure of which is incorporated herein by reference.

FIELD OF THE INVENTION

The present invention is directed generally to a sprayer, and more particularly to a sprayer having a handle and a sudsing attachment.

BACKGROUND

Professional car washing systems often employ sudsing sprayers to soften and clean dirt and debris. However, consumer sudsing sprayers are often bulky and difficult to manipulate. Furthermore, sudsing sprayers are difficult to attach and detach from a hose when a user wishes to wash the detergent off a car. Accordingly, there is a need in the art for a simple sudsing attachment that may be easily detached from a sprayer handle.

SUMMARY OF THE INVENTION

The present disclosure is directed to a sudsing sprayer that includes a handle and an easily detached sudsing attachment. More particularly the disclosure is directed to a sudsing attachment having a detachable canister that may be filled with car washing detergent or any other cleaning solution, to create a sudsing spray. The sudsing attachment may be attached to a spraying handle by way of a teeth and tab attachment structure that allows the sudsing attachment to rotatably lock onto a spraying handle.

Generally, in one aspect, a car washing implement comprises a handle defining a channel, the handle including a nozzle in communication with the channel and positioned to eject a flow of water from the handle, wherein the handle further includes a plurality of teeth, arranged in a predetermined configuration, and extending radially outward from the nozzle, a sprayer, defining a second channel having a first and a second end, wherein the second end terminates in a second nozzle and the first end is dimensioned to receive at least a portion of the nozzle of the handle such that the flow of water is directed into the second channel, wherein the sprayer further includes a plurality of tabs, each having at least a first side facing in the direction of the second nozzle, and spaced such that the plurality of teeth may insert between the tabs and rotate to engage at least one of the tabs; and a canister in communication with the second channel via a port, and configured to store and deliver a detergent to the second channel when water is flowing through the second channel.

In various embodiments, the first side of the tabs is sloped to engage the teeth of the handle.

In various embodiments, the second channel narrows such that the resulting pressure in the second channel induces the detergent and water to mix and sud.

In various embodiments, the second nozzle is configured to eject the flow of water in a substantially flat stream.

In various embodiments, the second nozzle is rotatable.

In various embodiments, the handle has a locking tab configured to slidably engage with the sprayer and to prevent the teeth of the handle from disengaging with the tabs of the sprayer.

BRIEF DESCRIPTION OF THE DRAWINGS

The various embodiments will be better understood in conjunction with the following drawings, wherein like reference numerals generally refer to like parts throughout.

DETAILED DESCRIPTION OF THE EMBODIMENTS

Figure 1:
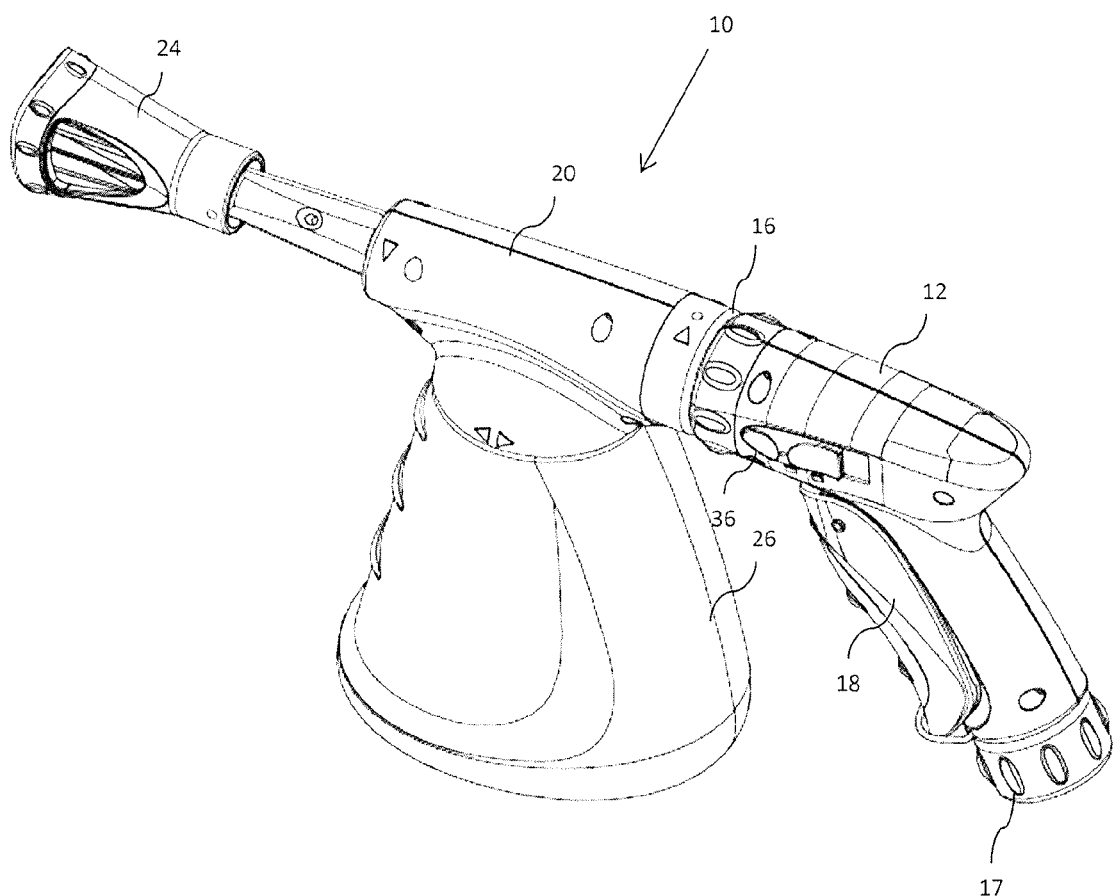
FIG. 1 is perspective view of a sprayer according to an embodiment.
Figure 2:
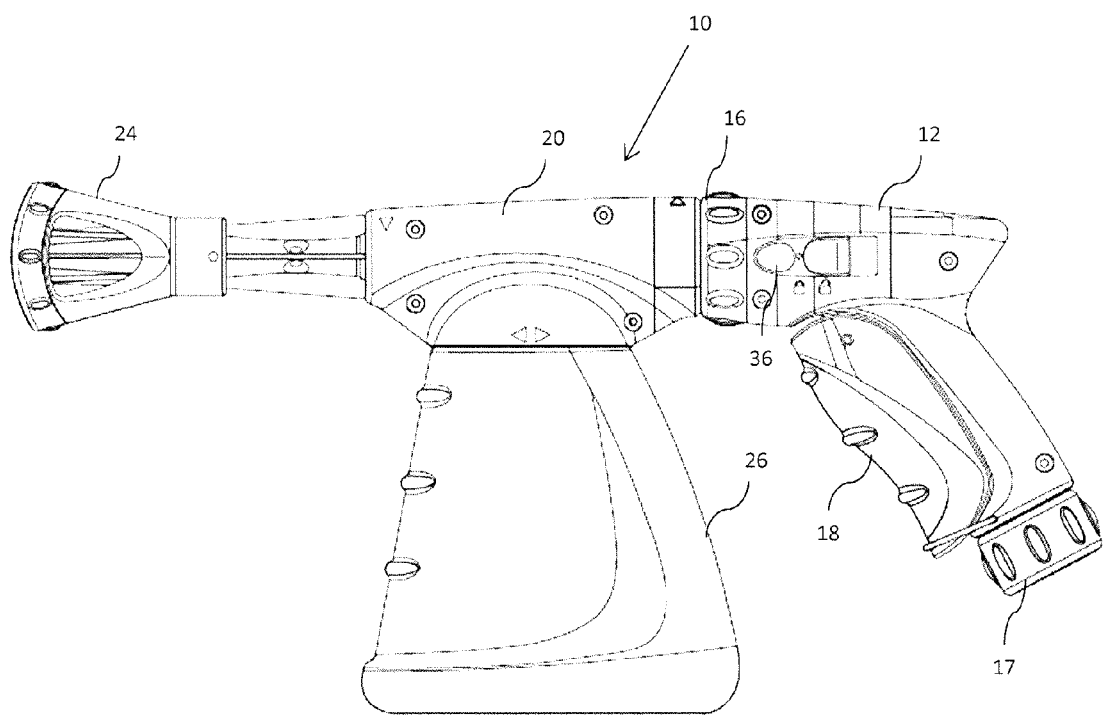
FIG. 2 is a side view of a sprayer according to an embodiment.

Referring now to the Figures wherein like reference numerals refer to like parts throughout, there is shown in FIG. 1 and FIG. 2 a sprayer 10 according to an embodiment. As shown, sprayer 10 comprises a handle 12, which defines a channel 14 for receiving and communicating a flow of water out of a first nozzle 16. Channel 14 may receive the flow of water via a hose (not shown) attached to an input port 17. Input port 17 may be threaded or otherwise configured to securely engage the hose and receive the flow of water. Although input port 17 is shown to attach to the base of handle 12, it should be recognized that input port may be located at any point on handle 12 that is suitable for receiving a flow of water. Sprayer 10 may further include a trigger 18 that is attached to sprayer 10 via a pivot. The trigger 18 may be operably attached to a valve positioned within channel 14 for interrupting the flow of water when trigger 18 is released and for allowing a user to adjust the flow of water through channel 14 by squeezing the trigger.

Sprayer 10 may further include a sudsing attachment 20. Sudsing attachment 20 may have a second channel 22, and a second nozzle 24. Sudsing attachment may have an opening at the end opposing the second nozzle 24, or elsewhere, for receiving the nozzle 16 of handle 12. The opening may be in communication with a second channel 22 that is adapted to receive water from the first channel 14 and conduct it to the second nozzle 24. Second nozzle 24 may be shaped and dimensioned to eject water in a substantially flat stream, although other stream shapes may be formed in alternate embodiments. Second nozzle 24 may also be rotatable to allow a user to modify the angle of the stream.

Sudsing attachment 20 may further include a detachable canister 26. Canister 26 may be filled with detergent or other cleaning solution. In an embodiment, detergent may be a gel-based detergent. Canister 26 may be in communication with the first channel via a port and configured to deliver detergent to the second channel 22 when water is flowing through the second channel 22. It will be appreciated that any number of methods may be used for drawing detergent into the second channel 22, as are known in the art. In an exemplary embodiment, a narrowing of second channel 22 may cause backpressure in second channel 22 such that detergent mixes with the flow of water, causing suds to form.

Figure 3:
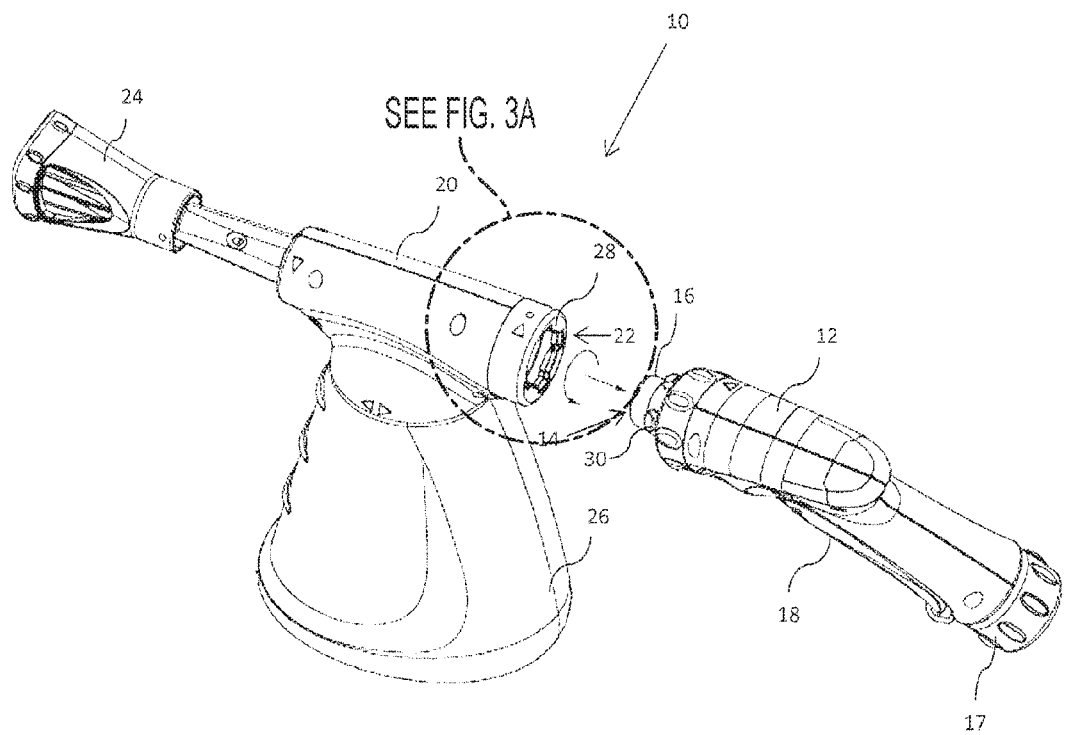
FIG. 3 is a perspective view of a sprayer according to an embodiment.
Figure 3A:
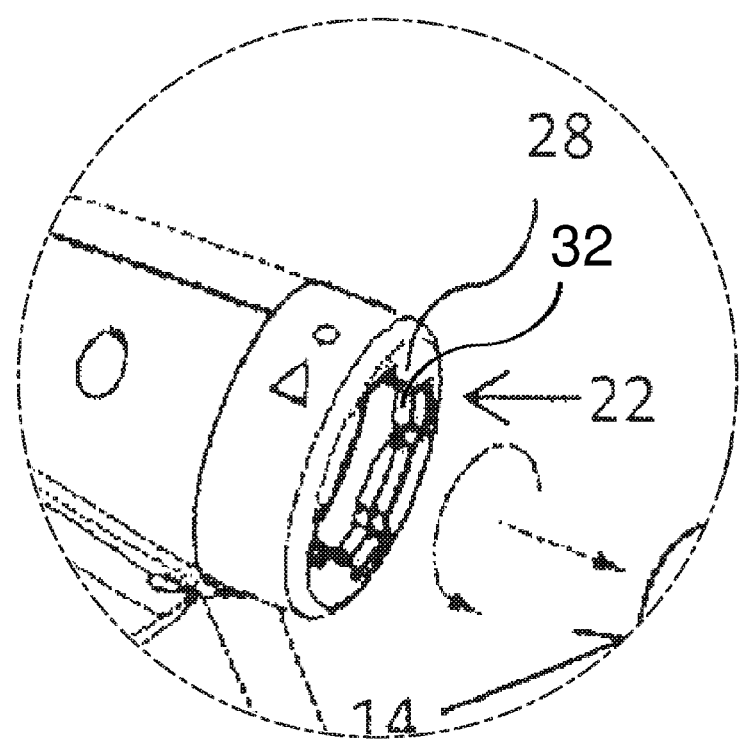

As shown in FIG. 3, sudsing attachment 20 may be detached from handle 12, so that the flow of water exits first nozzle 16, without being directed into sudsing attachment 20, and thus is not mixed with the detergent. Although other attachment methods may be used such as a threaded connector, as shown in FIG. 3, sudsing attachment may be connected via a plurality of tabs 28 that extend into or about second channel 22. The plurality of tabs 28 are configured to engage with a plurality of teeth 30 that extend radially from handle 12. Tabs 28 may have a first 32 and second side 34: the first side 32 being substantially perpendicular to the longitudinal axis of second channel 22 and facing the second nozzle 24. As shown, tabs 28 and teeth 30 may be dimensioned such that teeth 30 may fit between and rotate behind tabs 28, and that the teeth 30 engage with the first side 32 of tabs 28. In an embodiment, first side 32 of tabs 28 may be sloped such that the surface of first side lies at an oblique angle to the longitudinal axis of second channel 22, such that teeth will frictionally engage and grip first side 32 of tabs 28. Teeth 30 and tabs 28 may be located at any point on handle 12 and sudsing attachment 20, respectively, that is suitable for engaging teeth 30 and tabs 28. For example, teeth 30 and tabs 28 may staggered along the longitudinal axis of handle 12 and sudsing attachment 20, respectively. It will be appreciated that teeth 30 and tabs 28 may arranged in any manner so long as at least one tooth of teeth 30 and one tab of tab 28 are positioned to engage with each other, such that handle 12 is locked with sudsing attachment 20. In yet another embodiment, teeth may be located on sudsing attachment 20 and corresponding tabs 28 may be located on handle 12.

Figure 4:
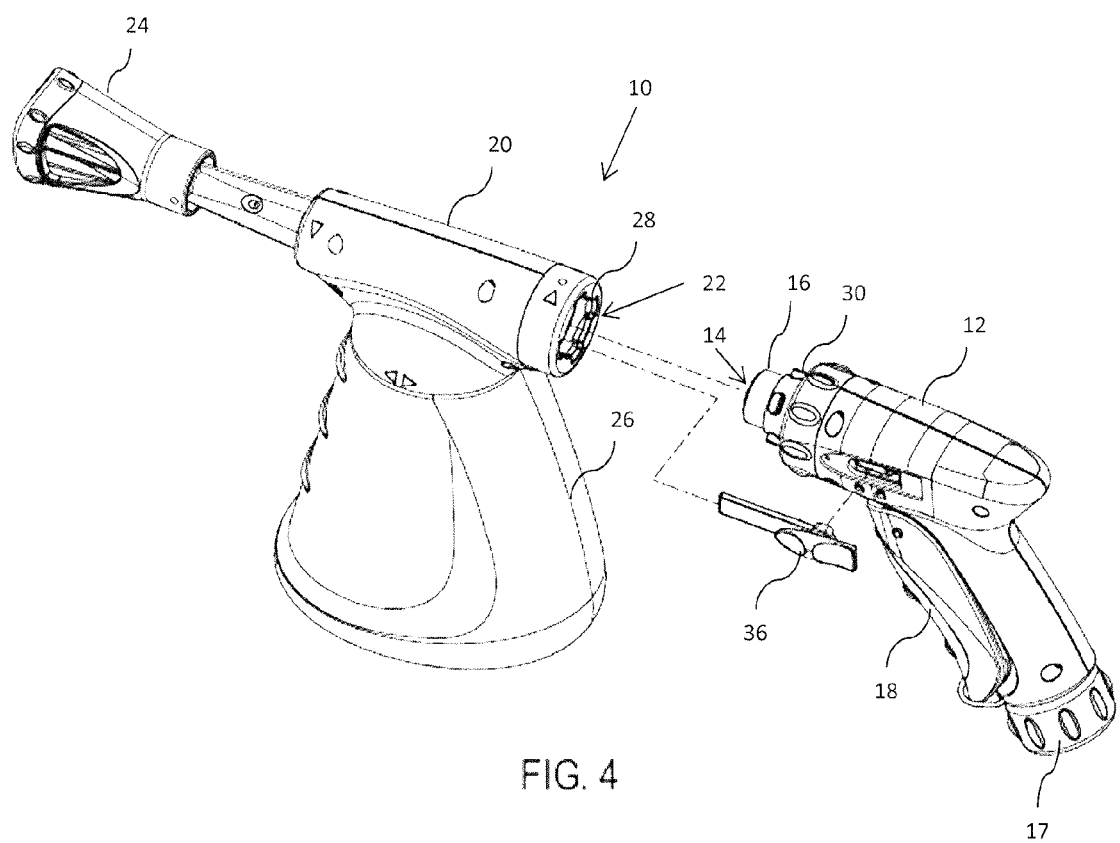
FIG. 4 is a perspective view of a sprayer according to an embodiment.
Figure 5:
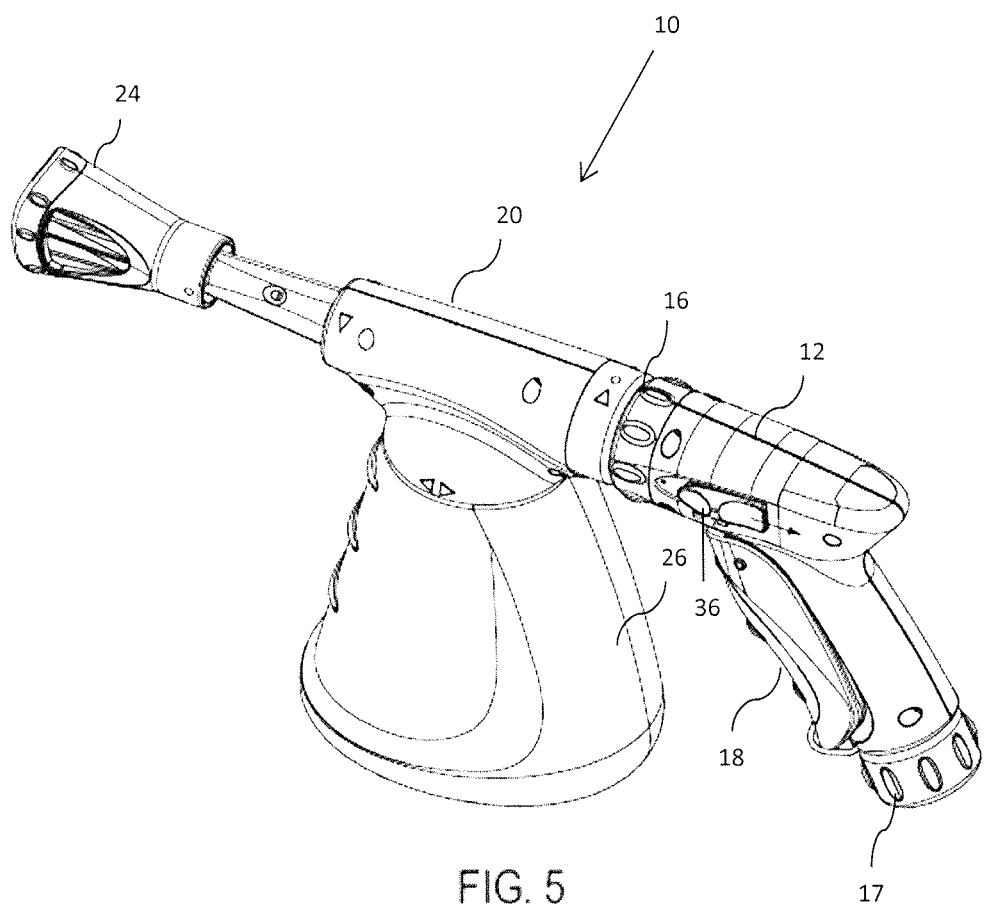
FIG. 5 is a side view of a sprayer according to an embodiment.

As shown in FIGS. 4 and 5, spraying handle 12 may further include a locking attachment 36 that may slidably engage with the sudsing attachment 20, so as to prevent spraying handle 12 rotatably disengaging with sudsing attachment 20. In one embodiment, locking attachment 36 may abut a portion of the sudsing attachment 20, when engaged, such that locking attachment 36 is prevented from rotating. In an embodiment, the locking attachment 36 abuts one of tabs 28. In other embodiment, locking attachment 36 may slide into a dedicated slot of sudsing attachment 20 and thereby prevent handle 12 from rotating with respect to the sudsing attachment 20.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A car washing implement, comprising:
a handle defining a channel, the handle including a nozzle in communication with the channel and positioned to eject a flow of water from the handle, wherein the handle further includes a plurality of teeth, arranged in a predetermined configuration, and extending radially outward from the nozzle,
a sprayer, defining a second channel having a first and a second end, wherein the second end terminates in a second nozzle and the first end is dimensioned to receive at least a portion of the nozzle of the handle such that the flow of water is directed into the second channel, wherein the sprayer further includes a plurality of tabs, each having at least a first side facing in the direction of the second nozzle, and spaced such that the plurality of teeth may insert between the tabs and rotate to engage at least one of the tabs; and
a canister in communication with the second channel via a port, and configured to store and deliver a detergent to the second channel when water is flowing through the second channel;
wherein the handle has a locking tab configured to slidably engage with the sprayer and to prevent the teeth of the handle from disengaging with the tabs of the sprayer.

2. The car washing implement of claim 1, wherein the first side of the tabs is sloped to engage the teeth of the handle.

3. The car washing implement of claim 1, wherein the second channel narrows such that the resulting pressure in the second channel induces the detergent and water to mix and sud.

4. The car washing implement of claim 1, wherein the second nozzle is configured to eject the flow of water in a substantially flat stream.

5. The car washing implement of claim 1, wherein the second nozzle is rotatable.

* * * * *